(12) United States Patent
Mccoog

(10) Patent No.: US 9,715,645 B2
(45) Date of Patent: Jul. 25, 2017

(54) MARKING AGENT SUBSCRIPTION CREDITS

(71) Applicant: Hewlett-Packard Development Company, L.P., Houston, TX (US)

(72) Inventor: Phillip A Mccoog, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 13/908,912

(22) Filed: Jun. 3, 2013

(65) Prior Publication Data

US 2014/0355029 A1  Dec. 4, 2014

(51) Int. Cl.
*G06F 15/00* (2006.01)
*G06K 15/00* (2006.01)
*G06Q 20/14* (2012.01)
*G06K 15/02* (2006.01)

(52) U.S. Cl.
CPC ..... *G06K 15/4095* (2013.01); *G06K 15/1803* (2013.01); *G06Q 20/145* (2013.01)

(58) Field of Classification Search
CPC ..... G06F 3/1204; G06F 3/1218; G06F 3/1219
USPC ....................................... 358/1.14
See application file for complete search history.

(56) References Cited

U.S. PATENT DOCUMENTS

| | | | |
|---|---|---|---|
| 5,383,129 A | 1/1995 | Farrell | |
| 5,604,578 A * | 2/1997 | Shibuya | G03G 21/02 377/14 |
| 6,603,975 B1 * | 8/2003 | Inouchi et al. | 455/450 |
| 6,650,433 B1 | 11/2003 | Keane et al. | |
| 6,712,266 B2 | 3/2004 | Bartley et al. | |
| 6,801,333 B1 | 10/2004 | Weiss | |
| 6,854,839 B2 | 2/2005 | Collier et al. | |
| 7,043,523 B2 | 5/2006 | Haines et al. | |
| 7,065,497 B1 | 6/2006 | Brewster et al. | |
| 7,113,299 B2 | 9/2006 | Suzuki et al. | |
| 7,136,177 B1 | 11/2006 | Bryan et al. | |
| 7,319,535 B2 | 1/2008 | Cherry et al. | |
| 7,526,555 B2 | 4/2009 | Shahindoust | |
| 7,660,539 B2 | 2/2010 | Tye et al. | |
| 8,051,012 B2 | 11/2011 | Ramanathan et al. | |
| 8,296,202 B2 | 10/2012 | Matsuda et al. | |

(Continued)

FOREIGN PATENT DOCUMENTS

KR   1020020012299 A   2/2002
KR   1020020079446 A   10/2002

(Continued)

OTHER PUBLICATIONS

Xerox Econcierge Supplies Assistant Technical Information, <https://www.xeroxdirect.ca/include/XDEFS-01C.PDF >,2012.

(Continued)

*Primary Examiner* — Mark Milia
(74) *Attorney, Agent, or Firm* — HP Inc. Patent Department

(57) ABSTRACT

In one example of the disclosure, credit data indicative of a subscription credit is received at a printer via a first network. The printer is connected to a marking agent supply. The subscription credit is to authorize the printer to at least one of dispense or consume a credit quantity of marking agent from the supply according to a subscription. Job data is received at the printer via a second network.

20 Claims, 6 Drawing Sheets

(56) References Cited

U.S. PATENT DOCUMENTS

| | | |
|---|---|---|
| 2002/0152183 A1 | 10/2002 | Soares et al. |
| 2003/0011809 A1 | 1/2003 | Suzuki et al. |
| 2003/0074312 A1 | 4/2003 | White |
| 2003/0078863 A1 | 4/2003 | Pilu |
| 2003/0187808 A1 | 10/2003 | Alfred et al. |
| 2004/0056889 A1 | 3/2004 | Katano |
| 2004/0138945 A1 | 7/2004 | Adkins et al. |
| 2004/0196491 A1 | 10/2004 | Uchino |
| 2004/0201613 A1 | 10/2004 | Foster et al. |
| 2004/0215580 A1 | 10/2004 | Pilu et al. |
| 2005/0289054 A1 | 12/2005 | Silverbrook et al. |
| 2006/0069615 A1 | 3/2006 | Gupta |
| 2006/0074816 A1 | 4/2006 | Hibara et al. |
| 2006/0271424 A1 | 11/2006 | Gava et al. |
| 2007/0188530 A1* | 8/2007 | Garrana et al. .................. 347/7 |
| 2007/0283447 A1 | 12/2007 | Hong et al. |
| 2008/0310875 A1 | 12/2008 | Rahman et al. |
| 2009/0016743 A1 | 1/2009 | Tye et al. |
| 2009/0016748 A1 | 1/2009 | Ferlitsch |
| 2009/0030837 A1 | 1/2009 | Knodt |
| 2009/0070243 A1 | 3/2009 | Buck et al. |
| 2009/0089192 A1 | 4/2009 | Ferlitsch |
| 2009/0265286 A1 | 10/2009 | Nagarajan |
| 2010/0053673 A1 | 3/2010 | Oba |
| 2011/0220711 A1 | 9/2011 | Hendley et al. |
| 2011/0235113 A1 | 9/2011 | Ohara |
| 2012/0307263 A1 | 12/2012 | Ichikawa et al. |
| 2012/0327449 A1 | 12/2012 | Lee |
| 2013/0010333 A1 | 1/2013 | Anand et al. |
| 2013/0073391 A1 | 3/2013 | Young |
| 2013/0110744 A1 | 5/2013 | Hendley et al. |

FOREIGN PATENT DOCUMENTS

| | | |
|---|---|---|
| KR | 100812694 B1 | 3/2008 |
| WO | WO-0076204 A1 | 12/2000 |
| WO | WO-0102946 A1 | 1/2001 |
| WO | WO-0102948 A1 | 1/2001 |
| WO | WO-0184429 A1 | 11/2001 |
| WO | WO-2010056739 A2 | 5/2010 |
| WO | WO-2011115987 A2 | 9/2011 |

OTHER PUBLICATIONS

International Search Report & Written Opinion received in PCT Application No. PCT/US2013/051855, Apr. 29, 2014, 15 pages.

Kalochristianakis, M. et al., The Concept and Design of an Open, Integrated Print Charging System, (Research Paper), Panhellenic Conference on Informatics, Sep. 30-Oct. 2, 2011, pp. 292-296.

Staples, "Price List," Copy and Print, Jan. 17, 2009, <http://web.archive.org/web/20090117091458/http://www.staplescopyandprint.ca/Downloads/BrochureENG_pricelist.pdf>.

Wikipedia, "Digital wallet," Jul. 21, 2009, <http://web.archive.org/web/20090721024634/http://en.wikipedia.org/wiki/Digital_wallet>.

Wikipedia, "Electronic bill payment," Aug. 5, 2009, <http://web.archive.org/web/20090805062547/http://en.wikipedia.org/wiki/Electronic_bill_payment>.

Wikipedia, "Electronic money," May 3, 2009, <http://web.archive.org/web/20090503070004/http://en.wikipedia.org/wiki/Electronic_money>.

Wikipedia, "PayPal," Oct. 16, 2009, <http://web.archive.org/web/20091016145237/http://en.wikipedia.org/wiki/PayPal>.

Wikipedia, "Prepaid mobile phone," Nov. 12, 2009, <http://web.archive.org/web/20091112171924/http://en.wikipedia.org/wiki/Prepaid_mobile_phone>.

* cited by examiner

MARKING AGENT SUBSCRIPTION CREDITS

BACKGROUND

Certain printers may subscribe to a marking agent provider service over a network. The marking agent provider service enables the printer to dispense or consume ink, toner, or other marking agent that is available at the printer according to a subscription.

BRIEF DESCRIPTION OF THE DRAWINGS

The accompanying drawings illustrate various examples and are a part of the specification. The illustrated examples do not limit the scope of the claims. Throughout the drawings, identical reference numbers designate similar, but not necessarily identical elements.

DETAILED DESCRIPTION OF EXAMPLES

Figure 1:
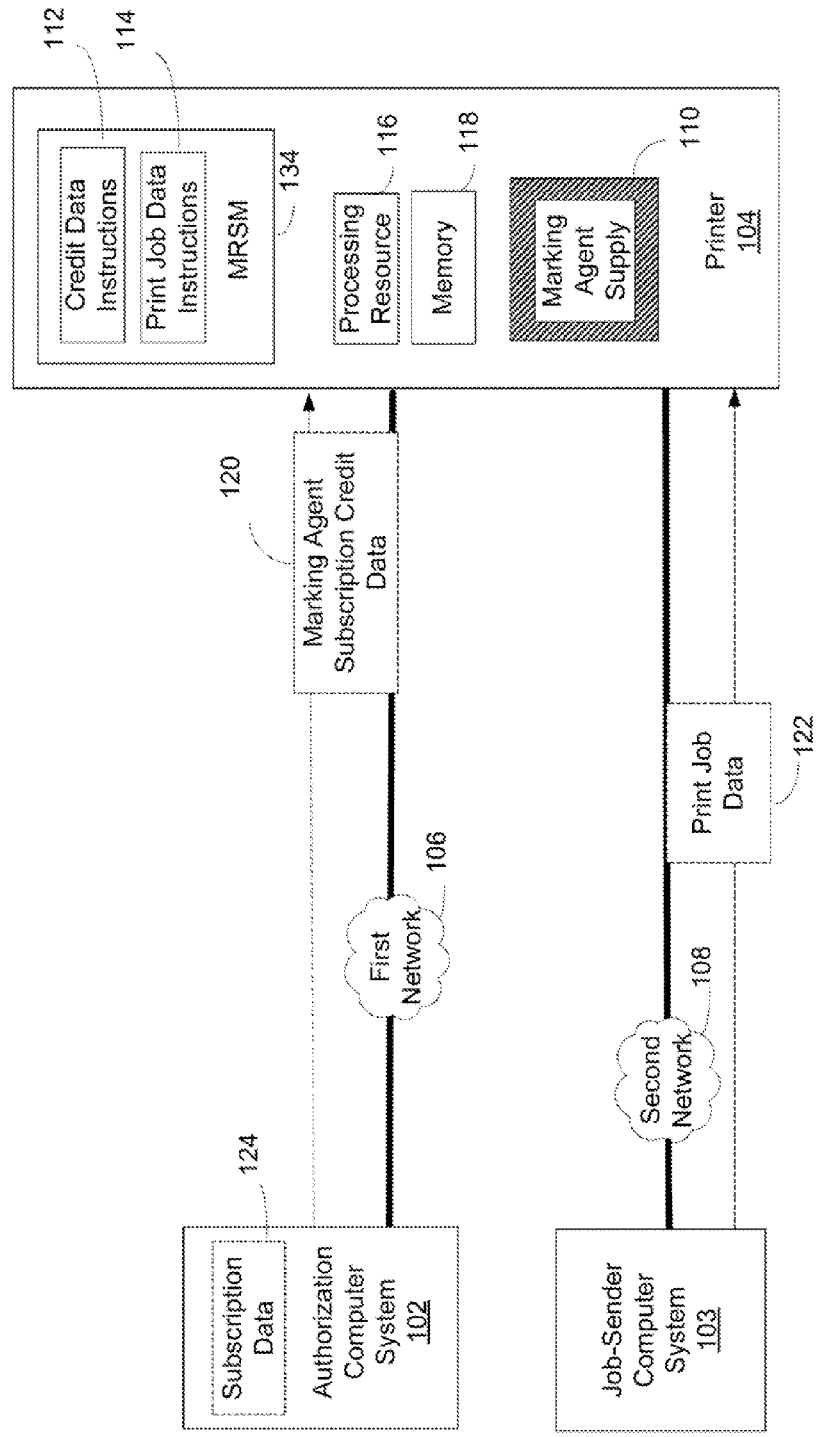
FIG. 1 is a block diagram illustrating a marking agent subscription credit system, according to various examples.

Providers of ink and other marking agents to printers according to subscription services are challenged to provide the marking agent in a reliable and uninterrupted manner while maintaining security and ease of use. In an example, a marking agent provider may, according to a subscription, authorize a printer to dispense or consume a predetermined quantity of a marking agent without regard to the amount of the marking agent physically present at the device.

In certain examples of marking agent subscription systems, a marking agent provider maintains, or frequently reestablishes, a network connection to a printer in order to deliver new page or marking agent disbursement or usage credits to the printer. In some implementations, a marking agent provider sends disbursement or usage credits to the printer multiple times per day.

Keeping a network connection open or readily available for transmission of disbursement or usage credits to a printer can be challenging. For example, a user may choose to connect his or her printer via a link that does not facilitate the printer to marking agent provider communication. Such a user may choose not to connect the printer to the internet. Or, if the printer is connected to the internet, a user may not quickly recognize a loss of printer connectivity with the internet. In another example, a user may utilize a printer that is connected to a local network with an internet connection, but the printer experiences failures in delivery of marking agent credits due to unreliability of the local network connection. Significant user dissatisfaction can occur if a user's printer does not function because of interruptions in the printer's inability to receive marking agent credits. This dissatisfaction may extend to the marking agent subscription service, the printing device, and/or the provider of the printing device.

To address these issues, examples described herein may provide a system and method for reliably, cost-effectively and securely providing marking agent subscription credits to a printer. In an example of the disclosure, a computer system may send, and a printer may receive, via a first network, data indicative of a subscription credit. The printer has an onboard, or is otherwise connected to, a marking agent supply. The subscription credit is to authorize the printer to dispense or consume a credit quantity of marking agent from the supply according to a subscription. In an example, the first network may be a cellular network not to be utilized for receiving print job data, and the second network may be a local network for receiving print job data. In an example, the computer system may receive subscription data indicative of the subscription, and determine the subscription credit according to rules included with the subscription.

Advantages of the disclosure are numerous. First, users will appreciate that the disclosed system and method enables marking agent providers to provide marking agent credits to a printer in a reliable and uninterrupted manner while maintaining security and ease of use. Further, by limiting the data to be communicated via the first network, the disclosed system and method can be used to provide the subscription credits via a low-cost, low bandwidth first network in a manner that can be inexpensive for the marking agent provider and the printer user. Marking agent providers will appreciate the customer goodwill and service call and troubleshooting time saved as a result of the disclosed system and method's approach to providing marking agent credits to a printer. Advantages of the disclosure will cause users of printers to be more likely to utilize network provider services that authorize a printer to utilize marking agent according to subscriptions, and user satisfaction with the printers and the resource provider services will increase.

As used in this application, a "marking agent" refers to any substance that can be consumed or dispensed by a printer during a printing operation, including but not limited to aqueous inks, solvent inks, UV-curable inks, dye sublimation inks, latex inks, toners, and powders. A "printer" or "printing device" refers to any liquid inkjet printer, solid toner-based printer, liquid toner-based printer, or any other electronic device that prints (e.g., any multifunctional electronic device that performs a function such as scanning and/or copying in addition to printing). A "printer application" refers to a web application or other software application that is accessible to a user at a network connected printer. In examples, a printer application enables a printer to retrieve content from computing devices external to the printer via an internet or intranet. A "print job" or "print job data" refers to content and/or instructions as to formatting and presentation of the content sent to a computer system for printing. A print job may be stored in a programming language and/or numerical form so that it can stored and used in computing devices, servers, printers and other machines capable of performing calculations and manipulating data.

A "subscription" refers to a right, contract, pledge, or other arrangement for a provider to authorize a device to dispense or consume a prescribed amount of a marking agent for a sum paid, or a fee agreed to be paid, to the provider. A "subscription quantity" refers to the amount of a marking agent that a device is authorized to dispense or consume, e.g., over a time period, pursuant to a subscription. A "subscription credit" refers to data that, when received by a printer, authorizes the printer to dispense or consume a credit quantity of a marking agent that is available at the printer pursuant to a subscription. Frequently, the credit quantity that is authorized for dispensation or consumption is less than the supply that is available at the printer. Likewise, frequently the credit quantity that is authorized for dispensation or consumption is less than the subscription quantity supply that is available at the printer.

A "network" refers to a collection of computing devices interconnected by communications channels that facilitate communications and allows sharing of resources and information among the interconnected devices. In examples, the network may be a proprietary network, a secured network, an open network, an intranet, an extranet, an internet or the Internet. A "local network" or "LAN" refers to a computer network that interconnects computers using physical connectors (e.g. wires or cables) or by use of high frequency radio signals (e.g., a WLAN). "Cellular network" is used synonymously with "mobile network", and refers to a radio network distributed over land areas called cells, each served by at least one fixed-location transceiver. When joined together these cells provide radio coverage over a wide geographic area.

As used herein, a "processing resource" and a "processor" are used synonymously and refer generally any instruction execution system, such as a computer/processor based system or an ASIC (Application Specific Integrated Circuit), a computer, or other system that can fetch or obtain instructions or logic stored in a memory and execute the instructions or logic contained therein. In examples, a processing resource or processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processor may include, for example, one processor or multiple processors included in a single computing device or distributed across multiple computing devices.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

Referring now to the drawings, FIG. 1 is a block diagram illustrating a marking agent subscription credit system according to various examples.

FIG. 1 shows a printer 104 electronically connected to an authorization computer system 102 via a first network 106, and to a job-sender computer system 103 via a second network 108. Authorization computer system 102 represents generally any computing device or group of computing devices configured to send and receive network requests, send and receive data, including marking agent subscription credit data 120, and/or otherwise communicate with printer 104 and other computing devices via the first network 106. Job-sender computer system 103 represents generally any computing device or group of computing devices configured to send and receive network requests, send and receive data, including print job data 122, and/or otherwise communicate with printer 104 and other computing devices via the second network 108.

Printer 104 represents generally any computing device or group of computing devices operable to dispense or consume a marking agent marking agent to produce a printed print job or printed content. Printer 104 is operable to send and receive network requests and data via the first and second networks 106 108, including receiving marking agent subscription credit data 120 from authorization computer system 102 via the first network 106, and receiving print job data from job-sender computer system 103. Printer 104 may be additionally operable to otherwise communicate with authorization computer 102 and job-sender computer 103 via the first and second networks 106 108.

First network 106 represents generally hardware components and computers interconnected by communications channels that allow sharing of marking agent subscription credits and other data. First network 106 may include a cable, wireless, fiber optic, or remote connection via a telecommunication link, an infrared link, a radio frequency link, or some combination of these, or any other connectors or systems that provide electronic communication.

Second network 108 represents generally hardware components and computers interconnected by communications channels that allow sharing of marking agents and information. Second network 108 may include a cable, wireless, fiber optic, or remote connection via a telecommunication link, an infrared link, a radio frequency link, or some combination of these, or any other connectors or systems that provide electronic communication.

First network 106 and second network 108 may also include intermediate proxies, routers, switches, load balancers, and the like. The paths followed by first network 106 between authorization computer system 102 and printer 104, and followed by second network 108 between job-sender computer system 103 and printer 104 as depicted in FIG. 1 represent the logical communication paths between these devices, not necessarily the physical paths between the devices.

In an example, printer 104 includes a processing resource 116 and a machine-readable storage medium 134 encoded with credit data instructions 112 and print job data instructions 114. In an example, the instructions 112 114 cause the printer 104 to implement a marking agent subscription credit service. In some examples, storage medium 134 may include additional instructions. In other examples, instructions 112 114 and any other instructions described herein in relation to storage medium 134 may be stored on a machine-readable storage medium remote from but accessible to computing device 102 and processing resource 116.

Processing resource 116 may fetch, decode, and execute instructions stored on storage medium 134 to implement the functionalities described below. In other examples, the functionalities of any of the instructions of storage medium 134 may be implemented in the form of electronic circuitry, in the form of executable instructions encoded on a machine readable storage medium, or a combination thereof.

In examples, printer 104 may be any sort of a printing device. In some examples, printer 104 may implement at least a portion of a marking agent subscription credit service. In some examples, instructions 112 114 may be part of a larger set of instructions implementing such a marking agent authorization quantity service. In some examples, portions of the marking agent authorization quantity service may be implemented on different computing devices.

In an example, marking agent supply 110 is a supply of ink, toner, or another marking agent that is onboard at printer 104, or that is otherwise connected and available to the printer 104. In this example, utilization of the onboard marking agent supply 110 by printer 104 is subject to a subscription that defines a subscription amount of the supply 110 that printer 104 is authorized to dispense or consume in a stated timeframe. In an example, the subscription is or includes a right, contract, pledge, or other arrangement that may be stored at or otherwise accessible to authorization computer system 102, and that authorizes the printer 104 to dispense or consume a subscription quantity of a marking agent 110.

In an example, the subscription may be a subscription received and stored at authorization computer system 102 as subscription data 124, or made accessible to the authorization computer system 102, responsive to a sum being paid, or an agreement that a sum will be paid, to a provider entity or provider user associated with the authorization computer system 102. Frequently the subscription and subscription data 124 sets the subscription quantity as an amount to be authorized or provided by a marking agent provider over a defined time period.

As used in this disclosure, a "subscription" is not limited to an arrangement where the fee is prepaid. In an example, the subscription data 124 may be representative of a subscription arrangement where the fee is to be paid after the dispensation or consumption of the marking agent. In a particular example, the fee to be paid to a provider pursuant to a subscription may be a fee to be paid at the end of a measuring period (e.g., end of month), e.g., $X at the end of each month to authorize a predetermined consumption of marking agent 110, e.g., ink to print 500 document pages at the printer 104. In other examples, the subscription and subscription data 124 may define a subscription quantity according to a permitted dispensation of the marking agent 110 measured by a dispensation or ejection time period, or a subscription quantity of the marking agent 110 measured by a permitted dispensation volume. In examples, the provider authorization computer system 102 may, according to the subscription and subscription data 124, authorize the printer 104 to dispense or consume a predetermined subscription quantity of a marking agent 110 that is a portion of, or less than, an amount of the marking agent 110 that is physically accessible to the printer 104.

In the example of FIG. 1, printer 104 and/or the marking agent supply 110 at printer 104 may include security features such that in order for the printer 104 to utilize a portion of the subscription amount of onboard marking agent supply 110, the printer 104 receives from authorization computer system 102 marking agent subscription credit data 120 indicative of a subscription credit. A subscription credit 120, when received at the printer 104, authorizes the printer 104 to dispense or consume a portion of the subscription quantity that is a "credit quantity" of the marking agent supply 110 for printing. In an example, the credit quantity may be expressed as a number of pages authorized for printing. In another example, the credit quantity may be expressed as a quantity of marking agent to be dispensed or consumed by the printer (e.g. picoliters of ink, cubic millimeters of toner, etc.).

Continuing with the example of FIG. 1, the printer 104 may utilize the second network 108 to receive print job data 122 from job-sender computing device 103 or other computing devices. In examples, the second network 108 may be a local network distinct from the first network 106. In examples, the second network 108 may be one of, or include, a LAN, WLAN, a USB wired connection, an Ethernet wired connection, or a peer-to-peer network, and may include a connection to an internet or an intranet.

In order that the authorization computer system 102 may provide the subscription credit data 120 to the printer 104 in a reliable and cost-effective manner, the credit data instructions 112 causes the printer 104 to receive from the authorization computer system 102 the subscription credit data 120 via the first network 106 that is a network other than the second network 108. In an example of the disclosure, communications between the authorization computer system 102 and the printer 104 via the first network 106 may include, or be limited to, the authorization computer system 102 receiving a request for the credit, data 120, sending the credit data 120, and receiving or sending a confirmation of transfer of the credit data 120. In another example, in order for the authorization computer system 102 to provide the marking agent subscription credit 120 to the printer 104 in a reliable, yet cost-effective manner, the first network 106 may be a network that the printer 104 does not utilize for receiving print jobs. In another example, the first network 106 may have a bandwidth that is at least six orders of magnitude lower than the second network 122. In another example, the printer 104 may receive the subscription credit data 120 via the first network 106 at rate of less than five kilobytes per day. In yet another example, the printer 104 may receive the subscription credit data 120 via the first network 106 at rate of less than one kilobyte per day.

Continuing with the example of FIG. 1, print job data instructions 114 causes printer 104 to receive from job-sender computer 103, via second network 108, print job data 122 in connection with a print job.

Printer 104, having received via the first network 106 the subscription credit data 120 authorizing the printer to dispense or consume the credit quantity of marking agent from the supply 110 according to the subscription and subscription data 124, and having received via the second network 108 the print job data 122, is enabled to perform a printing operation to produce a hard copy output utilizing the print job data 122 and the marking agent supply 110.

In some examples, the credit data instructions 112 and print job data instructions 114 may be part of an installation package that, when installed, may be executed by processing resource 116 to implement the functionalities described herein in relation to the instructions 112 114. In such examples, storage medium 134 may be a portable medium, such as a CD, DVD, or flash drive, or a memory maintained by a server from which the installation package can be downloaded and installed. In other examples, the instructions 112 114 may be part of an application or applications already installed on authorization computer system 102 including processing resource 116. In such examples, the storage medium 134 may include memory such as a hard drive, solid state drive, or the like. While in the example of FIG. 1 the storage medium 134 and memory 118 appear as separate components or modules, in other examples some or all of memory 118 may be included within or a part of storage medium 134. In yet other examples, some or all of storage medium 134 may be included within or be a part of memory 118. In some examples, functionalities described herein in relation to FIG. 1 may be provided in combination with functionalities described herein in relation to any of FIGS. 2-6.

Figure 2:
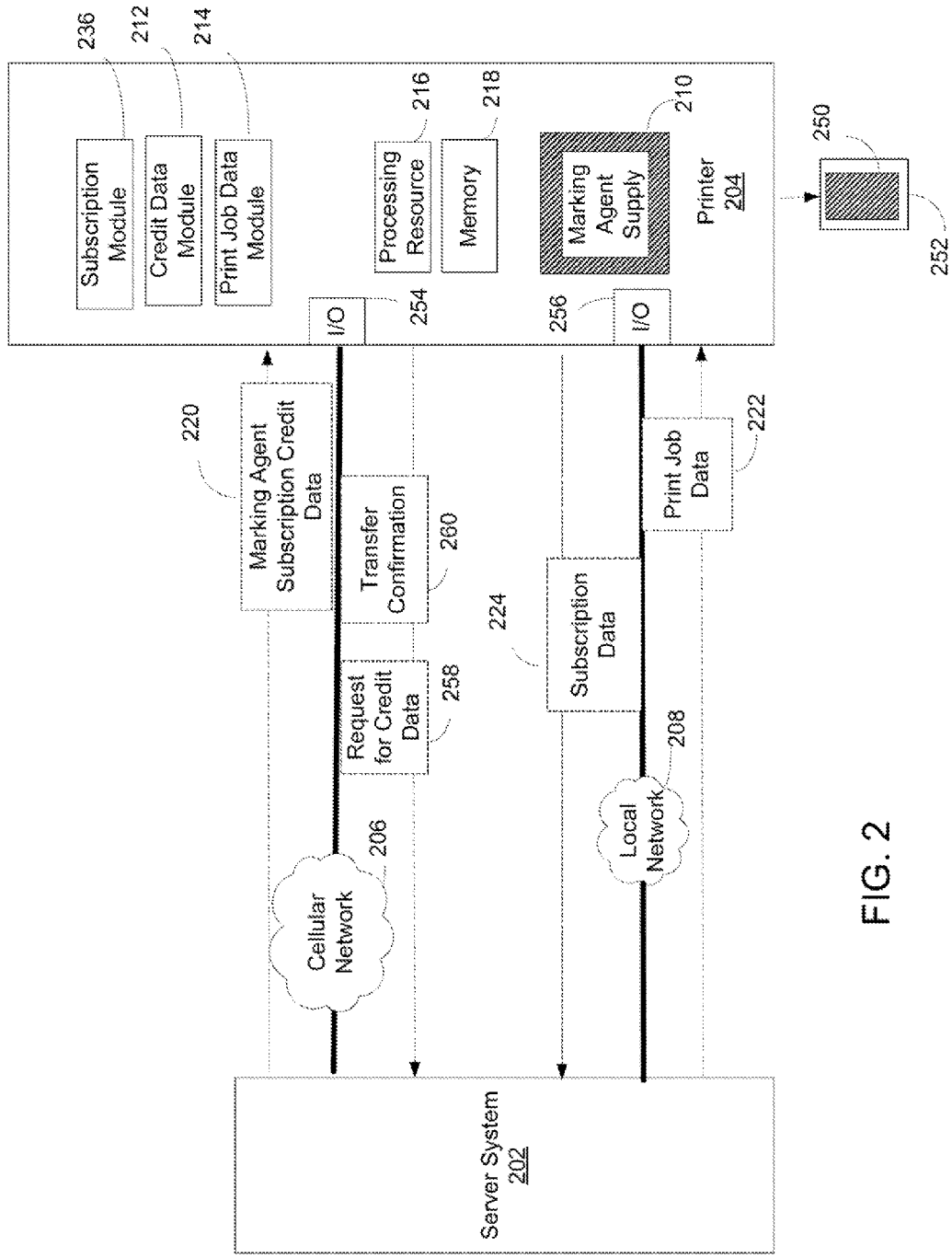
FIG. 2 is another block diagram illustrating a marking agent subscription credit system, according to various examples

FIG. 2 is a block diagram illustrating a marking agent subscription credit system according to various examples. FIG. 2 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a printer 204 electronically connected to an authorization and job-sender server system 202 via a cellular network 206 and via a local network 208. In an example, printer 204 may include a first input/output interface 254 for connecting with the first network 206, and a second input/output interface 256 for connecting with the second network 208. Input/output interfaces 254 and 256 suggest any architecture used to connect two or more hardware elements, including connections to pass electrical signals between such elements. In an example, input/output interface 254 or 256 may be or include hardware and/or software (e.g., but not limited to an interface card or port) configured for connecting printer 204 to networks 206 and 208, respectively.

Server system 202 represents generally any computing device or group of computing devices configured to send and receive network requests, send and receive data and/or otherwise communicate with printer 204 and other computing devices via the cellular and local networks 206 208, including sending subscription credit data 220 via the cellular network 206 and sending print job data via the local network 208.

Printer 204 represents generally any computing device or group of computing devices operable to dispense or consume a marking agent marking agent to produce a printed print job or printed content. Printer 204 is operable to send and receive network requests and data via the cellular and local networks 206 208, including receiving marking agent subscription credit data 220 from server system 202 via the cellular network 206, and receiving print job data 222 from server system 202 via the local network 208.

Each of cellular network 206 and local network 208 represents generally hardware components and computers interconnected by communications channels that allow sharing of marking agent subscription credits and other data. Each of cellular network 206 and local network 208 may include a cable, wireless, fiber optic, or remote connection via a telecommunication link, an infrared link, a radio frequency link, or some combination of these, or any other connectors or systems that provide electronic communication. Each of cellular network 206 and local network 208 may also include intermediate proxies, routers, switches, load balancers, and the like. The paths followed by cellular network 206 between server system 202 and printer 204, and followed by local network 208 between job-sender computer system 203 and printer 204 as depicted in FIG. 2 represent the logical communication paths between these devices, not necessarily the physical paths between the devices.

In the example of FIG. 2, printer 204 is shown to include a subscription module 236, a credit data module 212 and a print job data module 214, each electronically connected to a processing resource 216, and a memory 218. Memory 218 represents generally any memory configured to store program instructions and other data. In the example of FIG. 2, subscription module 236 causes the printer 204 to send subscription data 224 to the server system 202 via the local network 208. In an example, printer 204 may send the subscription data 224 to the server system 202 as a result of a user having interacted with a marking agent provision service web page hosted by server system 202 and accessed at the printer 204. In an example, the subscription data 224 is sent to, or made accessible to the server system 202 responsive to a sum being paid, or an agreement that a sum will be paid, to a provider entity or provider user associated with the server system 202. In an example, the subscription data 224 is descriptive of a subscription wherein the fee is to be paid after the dispensation or consumption of the marking agent 220. A particular example of a subscription for utilization of marking agent 220 at printer 204 follows:

subscription quantity=$X/month 100 pages included per month, $1 per 20 pages for additional pages per month, payment due: 30 days after end of month usage report.

Continuing with the example of FIG. 2, the credit data module 212 causes the server system 202 to send credit data 220 indicative of a subscription credit to printer 204 via a first communication channel that is cellular network 206. The cellular network 206 is a network that the printer 204 does not utilize for receiving print jobs. The subscription credit includes an authorization for the printer to dispense or consume a credit quantity of marking agent from printer's 204 onboard marking agent supply 210 according to the subscription 205. In an example, the printer 204 may send a request 258 for credit data 220 to the server system 202 via the cellular network 206. In an example, the printer 204 may send a confirmation 260 of transfer of the credit data 220 to the server system 202 via the cellular network 206.

The print job data module 214 causes the printer 204 to receive from the server system 202 print job data 222 via the local network 208. In examples, the local network 208 may include at least one of a LAN, WLAN, a USB wired connection, an Ethernet wired connection, and peer network connection. In an example the print job data 222 may include content to be printed to be sent to printer 204 for printing, and/or instructions as to formatting and presentation of the content.

Continuing with the example of FIG. 2, at a time following the printer 204 receiving the print job data 222 from server system 202 via the second network 208, printer 204 performs a printing operation that dispenses an authorized portion 250 of marking agent from the marking agent supply 210 upon a media to create a printed output 252. In an example the portion 250 is a quantity of marking agent that is less or equal to than credit quantity authorized by the marking agent subscription credit data 220 sent by the server system 202 to printer 204 via the first communication channel cellular network 206. In another example where printer 204 accumulated marking agent subscription credits other than the credit included within subscription credit data 220, the portion 250 may be a quantity of marking agent greater than the credit quantity authorized by the marking agent subscription credit data 220.

The functions and operations described with respect to the subscription module 236, credit data module 212, the print job data module 214, and the printer 204 may be implemented as a non-transitory computer-readable storage medium containing instructions executed by a processor (e.g., processing resource 216) and stored in a memory (e.g., memory 218). In a given implementation, processing resource 216 may represent multiple processors, and memory 218 may represent multiple memories.

Figure 3:
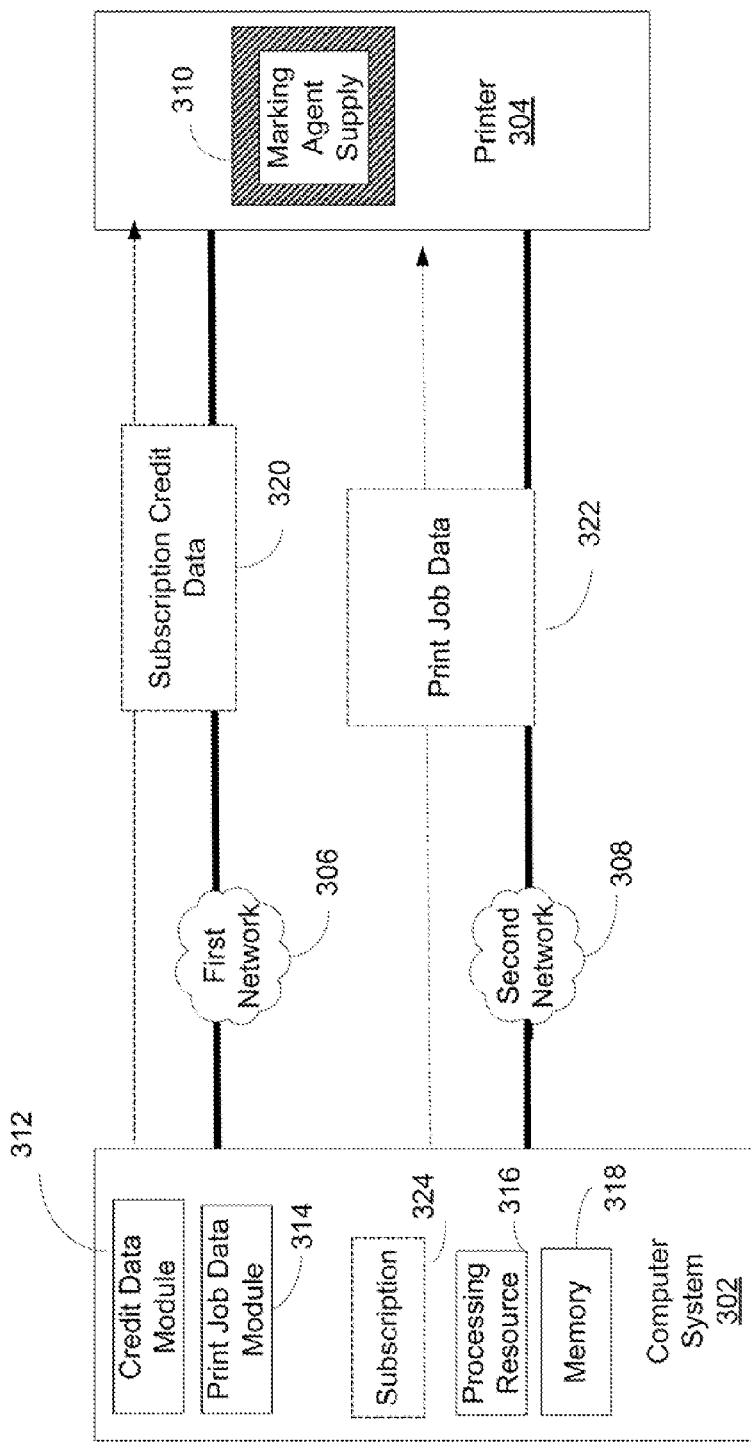
FIG. 3 is another block diagram illustrating a marking agent subscription credit system, according to various examples

FIG. 3 is a block diagram illustrating a marking agent subscription credit system according to various examples. FIG. 3 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 3 shows a computer system 302 and a printer 304, with the computer system 302 and the printer 304 each connected to a first network 306 and a second network 308. Computer system 302 represents generally any computing device or group of computing devices configured to send and receive network requests, send and receive data, and/or otherwise communicate with other computing devices such as printer 304 via the first network 306 and the second network 308. Printer 304 represents generally any computing device or group of computing devices configured to send and receive network requests, send and receive data, and/or otherwise communicate with other computing devices such as computer system 302, and additionally operable to dispense or consume a marking agent 310.

First network 306 represents generally hardware components and computers interconnected by communications channels that allow sharing of marking agents and information. First network 306 may include a cable, wireless, fiber optic, or remote connection via a telecommunication link, an infrared link, a radio frequency link, or some combination of these, or any other connectors or systems that provide electronic communication. First network 306 may include, at least in part, an intranet, the internet, or a combination of both. First network 306 may also include intermediate proxies, routers, switches, load balancers, and the like. The paths followed by first network 306 between the computer system 302 and the printer 304 as depicted in FIG. 3 represent the logical communication paths between these devices, not necessarily the physical paths between the devices.

Second network 308 represents generally hardware components and computers interconnected by communications channels that allow sharing of marking agents and information. Second network 308 may include a cable, wireless, fiber optic, or remote connection via a telecommunication link, an infrared link, a radio frequency link, or some combination of these, or any other connectors or systems that provide electronic communication. Second network 308 may include, at least in part, an intranet, the internet, or a combination of both. Second network 308 may also include intermediate proxies, routers, switches, load balancers, and the like. The paths followed by second network 308 between the computer system 302 and the printer 304 as depicted in FIG. 3 represent the logical communication paths between these devices, not necessarily the physical paths between the devices.

In the example of FIG. 3, computer system 302 is shown to include a credit data module 312 and a print job data module 314, each electronically connected to a processing resource 316, and a memory 318. Memory 318 represents generally any memory configured to store program instructions and other data.

In an example, marking agent supply 310 is a supply of ink, toner, or another marking agent that is onboard at printer 304, or that is otherwise connected and available to the printer 304. In this example, utilization of the onboard marking agent supply 310 by printer 304 is subject to a subscription 324 that defines a subscription amount of the supply 310 that printer 304 is authorized to dispense or consume in a stated timeframe. In an example, the subscription 324 is or includes a right, contract, pledge, or other arrangement that is stored at or otherwise accessible to computer system 302, and that authorizes the printer 304 to dispense or consume a subscription quantity of a marking agent 310. In another example, the subscription 324 may be received at computer system 302 from another computing device. In another example, the subscription 324 may be stored at another computing device or storage location separate from computer system 302, and accessed as needed by computer system 302.

In an example, the subscription 324 is received at computer system 302, or made accessible to the computer system 302, responsive to a sum being paid, or an agreement that a sum will be paid, to a provider entity or provider user associated with the computer system 302. Frequently the subscription 324 sets the subscription quantity as an amount to be authorized or provided by a marking agent provider over a defined time period.

Continuing with the example of FIG. 3, the computer system 302 utilizes the second network 308 to communicate print job data 322 to the printer 304. In examples, the second network 308 may be a local network distinct from the first network 306. In examples, the second network 308 may be one of, or include, a LAN, WLAN, a USB wired connection, an Ethernet wired connection, or a peer-to-peer network, and may include a connection to an internet or an intranet.

In order that the computer system 302 may provide the subscription credit data 320 to the printer 304 in a reliable and cost-effective manner, the credit data module 312 causes computer system 302 to send the subscription credit data 320 to the printer via the first network 306 that is a network other than the second network 308 utilized to communicate print jobs and other print job data 322. In an example of the disclosure, communications between the computer system 302 and the printer 304 via the first network 306 may include, or in a particular example be limited to, the computer system 302 receiving a request for the credit data 320, sending the credit data 320, and receiving or sending a confirmation of transfer of the credit data 320. In another example, in order for the computer system 302 to provide the marking agent subscription credit 320 to the printer 304 in an reliable, yet cost-effective manner, the first network 306 may have a bandwidth that is at least six orders of magnitude lower than the second network 322 utilized by the computer system 302 to send print job data 322 to the printer 304. In another example, the first network 306 may be a cellular or mobile network, and the computer system 302 may send the subscription credit data 320 to the printer 304 via the first network 306 at rate of less than five kilobytes per day. In yet another example, the first network 306 may be a cellular or mobile network, and the computer system 302 may send the subscription credit data 320 to the printer 304 via the first network 306 at rate of less than one kilobyte per day.

Continuing with the example of FIG. 3, print job data module 314 causes computer system 302 to send print job data 322 to the printer 304 in connection with a print job. In an example, the print job data 322 may be a print job that was rasterized at computer system 302 for printing at printer 304. Printer 304, having received via the first network 306 the subscription credit data 320 authorizing the printer to dispense or consume the credit quantity of marking agent from the supply 310 according to the subscription 324, and having received via the second network 308 the print job data 322, is enabled to perform a printing operation to produce a hard copy output utilizing the print job data 322 and the marking agent supply 310.

The functions and operations described with respect to the credit data module 312, the print job data module 314, and the computer system 302 may be implemented as a non-transitory computer-readable storage medium containing instructions executed by a processor (e.g., processing resource 316) and stored in a memory (e.g., memory 318). In a given implementation, processing resource 316 may represent multiple processors, and memory 318 may represent multiple memories.

Figure 4:
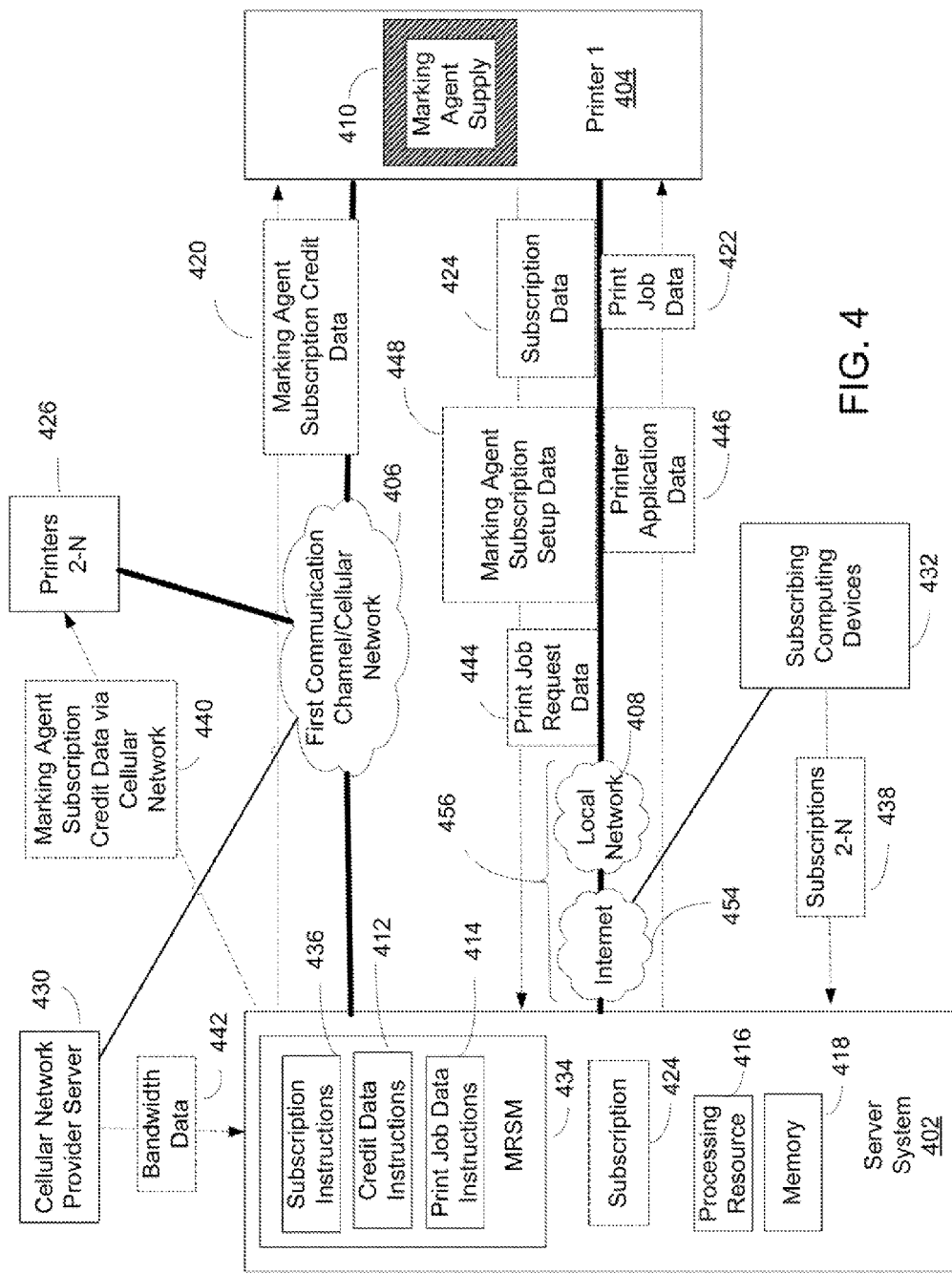
FIG. 4 is another block diagram illustrating a marking agent subscription credit system, according to various examples

FIG. 4 is a block diagram illustrating a marking agent subscription credit system according to various examples. FIG. 4 shows a server system 402, a printer one 404, printers 2-N 426, and a cellular network provider server 430, each electronically connected to a first communication channel that is a cellular network 406. FIG. 4 additionally shows that the server system 402 is additionally connected to printer one 404 via a second communication channel 456 that includes a local network 408 and an internet connection 454. Server system 402 represents generally any computing device or group of computing devices configured to send and receive network requests, send and receive data, and/or otherwise communicate with printer one 404 and printers two-N 426, cellular network provider server 430, and other computing devices via the first communication channel cellular network 406, and with printer one 404 via the second communication channel 456.

Printer one 404 represents generally any computing device or group of computing devices operable to dispense or consume marking agent from marking agent supply 410 to produce a printed print job or printed content, and additionally operable to send and receive packets including receiving marking agent subscription credit data from authorization server system 402 via the first communication channel cellular network 406, and to send and receive communications (including, but not limited to receiving print job data and printer application data) from server system 402, and otherwise communicating with other computing devices via the second communication channel 456.

Printers two-N 426 represent generally any computing device or group of computing devices operable to dispense or consume marking agent from the marking agent supply 410 to produce a printed print job or printed content, and additionally operable to send and receive packets including receiving marking agent subscription credit data from authorization server system 402 via the first communication channel cellular network 406.

Cellular network provider service 430 represents generally any computing device or group of computing devices configured to send and receive network requests, send and receive data, including sending bandwidth data, and/or otherwise communicate with server system 402 via first communication channel cellular network 406.

Subscribing computing devices 432 represent generally any computing device or group of computing devices configured to send and receive network requests, send and receive data, including sending subscriptions 438 for utilization of marking agent at a printer, and/or otherwise communicate with server system 402 via internet 454.

Cellular network 406 represents generally hardware components and computers interconnected by communications channels that allow sharing of marking agent subscription credits and other data. Cellular network 406 may include a cable, wireless, fiber optic, or remote connection via a telecommunication link, an infrared link, a radio frequency link, or some combination of these, or any other connectors or systems that provide electronic communication.

Second communication channel 456 includes local network 408 and internet 454. Local network 408 represents generally hardware components and computers interconnected by communications channels that allow sharing of marking agents and information. Local network 408 may include a cable, wireless, fiber optic, or remote connection via a telecommunication link, an infrared link, a radio frequency link, or some combination of these, or any other connectors or systems that provide electronic communication. Internet 454 may include, at least in part, an intranet, the Internet, or a combination of both.

First communication channel cellular network 406 and second communication channel 456 that includes local network 408 and internet 454 may also include intermediate proxies, routers, switches, load balancers, and the like. The paths followed by first communication channel cellular network 406 between computer system 402, printer one 404, printers two-N 426, and cellular network provider service 430, and followed by second communication channel 456 between computer system 402 and printer one 404 as depicted in FIG. 4 represent the logical communication paths between these devices, not necessarily the physical paths between the devices.

In an example, server system 402 includes a processing resource 416 and a machine-readable storage medium 434 encoded with subscription instructions 436, credit data instructions 412 and print job data instructions 414. In an example, the instructions 436 412 414 cause the server system 402 to implement a service to send marking agent subscription credits to printers. In some examples, storage medium 434 may include additional instructions. In other examples, instructions 436 412 414 and any other instructions described herein in relation to storage medium 434 may be stored on a machine-readable storage medium remote from but accessible to computing device 402 and processing resource 416.

Processing resource 416 may fetch, decode, and execute instructions stored on storage medium 434 to implement the functionalities described below. In other examples, the functionalities of any of the instructions of storage medium 434 may be implemented in the form of electronic circuitry, in the form of executable instructions encoded on a machine readable storage medium, or a combination thereof.

In examples, server system 402 may be any sort of a computing device. In some examples, server system 402 may implement at least a portion of a service to send marking agent subscription credits to printers. In some examples, instructions 436 412 414 may be part of a larger set of instructions implementing such a marking agent authorization quantity service. In some examples, portions of a marking agent authorization quantity service may be implemented on different computing devices.

In the example of FIG. 4, subscription instructions 436 stored at machine readable storage medium 434 cause the server system 402 to receive a subscription 424. In this example, a first subscription 424 is sent to the server system 402 by a printer one 404 via the second communication channel 456. In an example, the subscription 424 may be sent to the server system 402 as a result of a user having interacted with a marking agent provision service web page hosted by server system 402. In an example, the subscription 424 is sent to, or made accessible to the server system 402 responsive to a sum being paid, or an agreement that a sum will be paid, to a provider entity or provider user associated with the server system 402.

It should be noted that it is not a requirement that server system 402 receive the subscription from the printer to which the subscription relates. For instance, In the example of FIG. 4 server system also receives other subscriptions, e.g., subscriptions 2-N 438 applicable to printers 2-N 426, via internet 454 from subscribing computing devices 2-N 432 that may or may not be printing devices.

In examples, the subscription instructions 436 may additionally cause the server system 402 to determine a subscription credit according to rules included with the subscription. For example, if the subscription includes a subscription quantity=$X/month, 480 pages included per month, $1 per 40 pages for additional pages per month, and a rule that subscription credits are to be sent to the printer daily in amount of $1/30^{th}$ of the monthly subscription quantity, the server system may determine a daily subscription credit in the amount of 16 pages.

Continuing with the example of FIG. 4, the credit data instructions 412 stored at machine readable storage medium 434 cause the server system 402 to send credit data 420 indicative of a subscription credit to printer one 404 via a first communication channel that is cellular network 406. The subscription credit includes an authorization for the printer to dispense or consume a credit quantity of marking agent from printer's 404 onboard marking agent supply 410 according to the subscription 424. In the example of FIG. 4, the credit data instructions 412 may additionally cause the server system 402 to send other credit data 440 indicative of other subscription credits to other printers 2-N 426 via the first communication channel cellular network 406.

In an example, the credit data instructions 412 may cause the server system 402 to receive, e.g. from a cellular network provider server 430, bandwidth data 442 descriptive of a state of the first communication channel cellular network 406 In an example, the bandwidth data 442 may indicate that the cellular network 406 is in a bandwidth surplus state, e.g., a state in which the usage of the cellular network 406 is low relative to the norm or other period and therefore transaction expense for the transfer of credit data from the server system 402 to the printer one 404 is reduced. In an example, the credit data instructions 412, upon identifying via the bandwidth data 442 that the cellular network 406 is in a bandwidth surplus state, causes the server system 402 to send the subscription credit data 420 to printer one 404 via the cellular network 406 during the bandwidth surplus state.

The print job data instructions 414 stored at machine readable storage medium 434 cause the server system 402 to send print job data 422 to printer one 404 via the second communication channel 456 that, in the example of FIG. 4, includes local network 408 and an internet connection 454. In examples, the second communication channel 456 may be any communication channel other than the first communication channel, e.g. a second network including at least one of a LAN, WLAN, a USB wired connection, an Ethernet wired connection, and peer network connection.

In embodiments, the server system 402 may utilize the second communication channel 456 to transmit a variety of communications other than the sending of print job data 422 as described in the paragraph above. In an example, prior to the server system 402 sending the print job data 422 to printer one 404 via the second communication channel 456, the server system 402 may receive print job request data 444 from the printer one 404 via the second communication channel 456. In another example, the server system 402 may receive from printer one 404, via the second communication channel 456, a request that the server system 402 send to printer 404 a printer application. In an example, the server system 402 may, responsive to such request, send to printer one 404, via the second communication channel 456, printer application data 446 that includes the printer application. In an example, the printer application may be a web application or other software application that is accessible to a user at printer one 404 and enables printer one 404 to retrieve content from computing devices external to printer one 404 via the second communication channel 456. In examples, a printer application that is a web application may be a computer software application or web page that is coded in a browser-supported language (such as XML, HTML, or HTML with JavaScript) and is reliant on a web browser application to render the application executable (or in the case of a web page, presentable).

In another example, the print job data instructions 414 may additionally cause the server system 402 to utilize the second communication channel 456 as the conduit for sending to the printer 404, and receiving from printer one 404, marking agent subscription setup data 448 and other communications or messages relating to the setup of the subscription 424. For instance, the sending and receiving of the subscription setup data 448 over the second communication channel 456 may include server system 402 hosting, and a user at printer one 404 interacting with, a marking agent subscription service web page.

Continuing with the example of FIG. 4, at a time following the server system 402 sending the print job data 422 to printer one 404 via the second communication channel 456, printer one 404 performs a printing operation that dispenses an authorized portion of marking agent from the marking agent supply 410 upon a media to create a printed output.

In examples, the receiving of the subscription 424 from printer one over the second communication channel 456, the sending of marking agent subscription credit data 420 and the sending of marking agent subscription credit data 440 from the server system 402 to the printers two-N 426 over the first communication channel cellular network 406, and the sending print job request data 444, marking agent subscription setup data 448, printer application data 446 and/or print job data 422 over the second communication channel 456 may be via a networking protocol. The networking protocols utilized may include, but are not limited to. Transmission Control Protocol/Internet Protocol ("TCP/IP"). HyperText Transfer Protocol ("HTTP"), and/or Session Initiation Protocol ("SIP").

In some examples, the subscription instructions 436, credit data instructions 412, and print job data instructions 414 may be part of an installation package that, when installed, may be executed by processing resource 416 to implement the functionalities described herein in relation to the instructions 436 412 414. In such examples, storage medium 434 may be a portable medium, such as a CD, DVD, or flash drive, or a memory maintained by a server from which the installation package can be downloaded and installed. In other examples, the instructions 436 412 414 may be part of an application or applications already installed on server system 402 including processing resource 416. In such examples, the storage medium 434 may include memory such as a hard drive, solid state drive, or the like. While in the example of FIG. 4 the storage medium 434 and memory 418 appear as separate components or modules, in other examples some or all of memory 418 may be included within or a part of storage medium 434. In yet other examples, some or all of storage medium 434 may be included within or be a part of memory 418. In some examples, functionalities described herein in relation to FIG.

4 may be provided in combination with functionalities described herein in relation to any of FIG. 1-3 or 5-6.

Figure 5:
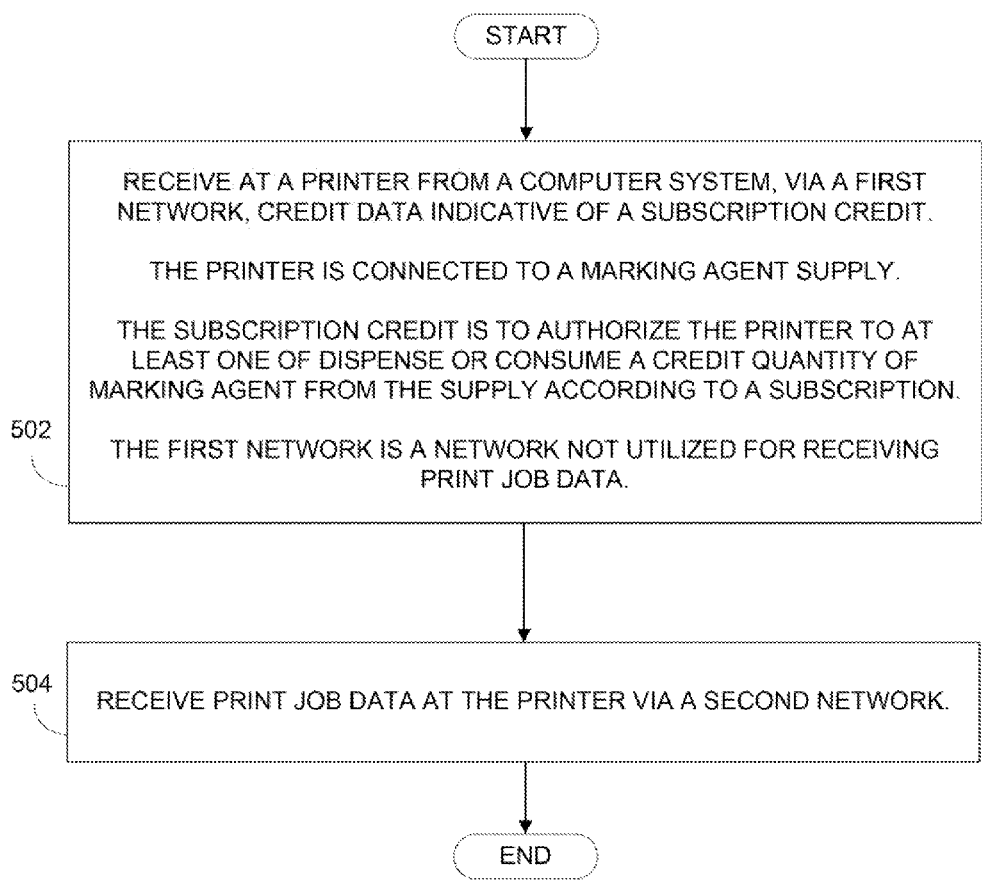
FIG. 5 is a flow diagram depicting steps taken to implement various examples.

FIG. 5 is a flow diagram of operation in a system according to various examples. In discussing FIG. 5, reference may be made to the diagrams of FIGS. 1 and 2 to provide contextual examples. Implementation, however, is not limited to those examples. Starting with FIG. 5, credit data indicative of a subscription credit is received at a printer via a first network. The printer is connected to a marking agent supply. The subscription credit is to authorize the printer to at least one of dispense or consume a credit quantity of marking agent from the supply according to a subscription. The first network is a network not utilized for receiving print job data (block 502). Referring back to FIGS. 1 and 2, the credit data module 212 (FIG. 2), or the credit data instructions 112 (FIG. 1), when executed by processing resource 116 (FIG. 1), may be responsible for implementing block 502.

Continuing with FIG. 5, print job data is received at the printer via a second network (block 504). Referring back to FIGS. 1 and 2, the print job data module 214 (FIG. 2), or the print job data instructions 114 (FIG. 1), when executed by processing resource 116 (FIG. 1), may be responsible for implementing block 504.

Figure 6:
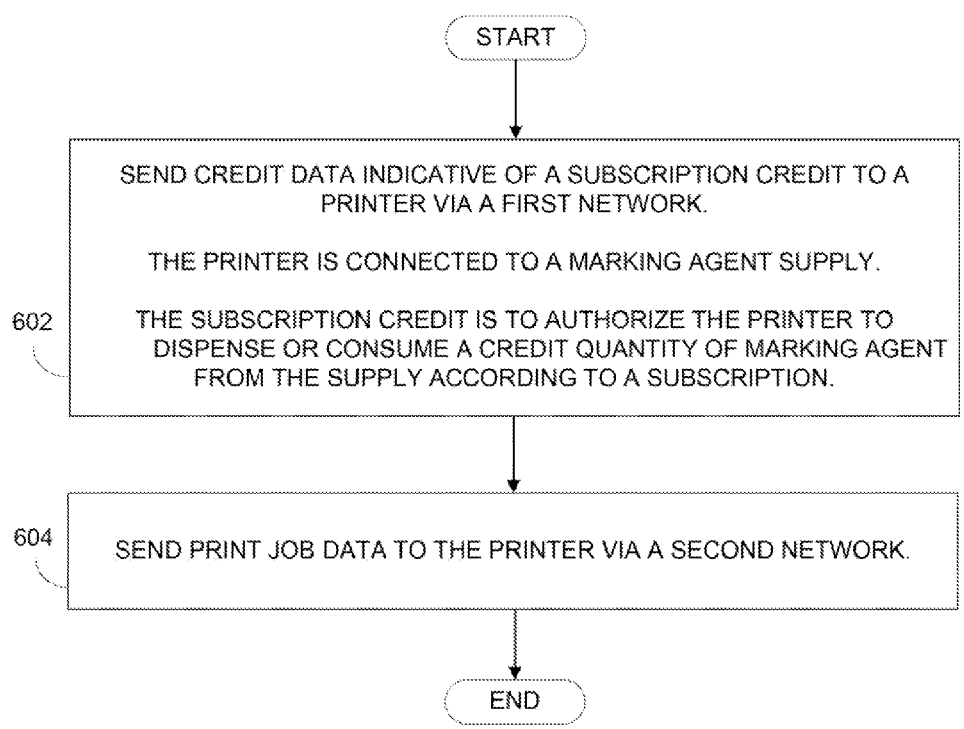
FIG. 6 is another flow diagram depicting steps taken to implement various examples.

FIG. 6 is a flow diagram of operation in a system according to various examples. In discussing FIG. 6, reference may be made to the diagrams of FIGS. 3 and 4 to provide contextual examples. Implementation, however, is not limited to those examples. Starting with FIG. 6, credit data indicative of a subscription credit is sent to a printer via a first network. The printer is connected to a marking agent supply. The subscription credit is to authorize the printer to at least one of dispense or consume a credit quantity of marking agent from the supply according to a subscription (block 602). Referring back to FIGS. 3 and 4, the credit data module 312 (FIG. 3), or the credit data instructions 412 (FIG. 4), when executed by processing resource 416 (FIG. 4), may be responsible for implementing block 602.

Continuing with FIG. 6, print job data is sent to the printer via a second network (block 604). Referring back to FIGS. 3 and 4, the print job data module 314 (FIG. 3), or the print job data instructions 414 (FIG. 4), when executed by processing resource 416 (FIG. 4), may be responsible for implementing block 604.

Various modifications may be made to the disclosed examples and implementations without departing from their scope. Therefore, the illustrations and examples herein should be construed in an illustrative, and not a restrictive, sense.

What is claimed is:

1. A non-transitory computer-readable storage medium storing instructions that, when executed by a processor, cause a printer to:
   receive at the printer, from an authorization computer system via a first network, marking agent subscription credit data for a user, wherein the marking agent subscription credit data for the user indicates a predetermined quantity of marking agent that the printer is authorized to dispense from a marking agent supply for the user over a predefined time period according to a user subscription with the authorization computer system, and wherein the first network is a network not to be utilized for receiving print job data;
   receive at the printer, from the authorization computer system via a second network different from the first network, print job data for the user;
   determine whether the marking agent subscription credit data for the user indicates that the user has sufficient marking agent for the print job data; and
   perform a printing operation of the print job data for the user in response to a determination that the marking agent subscription credit data for the user indicates that the user has sufficient marking agent for the print job data.

2. The medium of claim 1, wherein the first network has a bandwidth that is at least six orders of magnitude less than the second network.

3. The medium of claim 1, wherein the instructions cause the printer to receive the marking agent subscription credit data regardless of an amount of the marking agent physically present at the marking agent supply.

4. The medium of claim 1, wherein the first network utilized for receiving the marking agent subscription credit data has a bandwidth that is smaller than a bandwidth of the second network utilized for receiving the print job data.

5. The medium of claim 1, wherein the instructions cause the printer to send a request for the marking agent subscription credit data for the user from the printer to the authorization computer system via the first network.

6. The medium of claim 1, wherein the instructions cause the printer to send a confirmation of transfer of the marking agent subscription credit data to the authorization computer system via the first network.

7. The medium of claim 1, wherein the instructions cause the printer to send subscription data indicative of a marking agent subscription to the authorization computer system via the second network.

8. A printer, comprising:
   a marking agent supply;
   a processor; and
   a memory storing instructions, that when executed by the processor, cause the printer to:
     receive marking agent subscription credit data for a user from an authorization computer system via a first communication channel, wherein the marking agent subscription credit data for the user indicates a predetermined quantity of marking agent that the printer is authorized to dispense from the marking agent supply for the user over a predefined time period according to a user subscription with the authorization computer system, and wherein the first communication channel is not a channel to receive print job data;
     receive print job data for the user from the authorization computer system via a second communication channel different from the first communication channel;
     determine whether the marking agent subscription credit data for the user indicates that the user has sufficient marking agent for the print job data; and
     perform a printing operation of the print job data for the user in response to a determination that the marking agent subscription credit data for the user indicates that the user has sufficient marking agent for the print job data.

9. The printer of claim 8, further comprising a cellular network interface for the first communication channel and an LAN interface for the second communication channel.

10. A non-transitory computer-readable storage medium comprising instructions that, when executed by a processor of an authorization computer system, cause the authorization computer system to:

store marking agent subscription credit data for a user according to a subscription by the user with the authorization computer system;

send the marking agent subscription credit data for the user to a printer via a first network, wherein the marking agent subscription credit for the user indicates a predetermined quantity of marking agent that the printer is authorized to dispense from a marking agent supply for the user over a predefined time period according the user subscription, and wherein the first network is not utilized for sending print job data; and send print job data for the user to the printer via a second network, different from the first network, to cause the printer to perform a printing operation of the print job data after the printer determines that the marking agent subscription credit data for the user indicates that the user has sufficient marking agent for the print job data.

11. The medium of claim 10, wherein the first network has a bandwidth that is at least six orders of magnitude lower than the second network.

12. The medium of claim 10, wherein the marking agent subscription credit data is sent to the printer at a rate of less than five kilobytes per day.

13. The medium of claim 10, wherein the first network utilized for sending the marking agent subscription credit data has a bandwidth that is smaller than a bandwidth of the second is a cellular network utilized for sending the print job data.

14. The medium of claim 10, wherein the instructions cause the system to receive data indicative that the first network is in a state of bandwidth surplus that reduces transaction expense; and the marking agent subscription credit data is sent via the first network during the surplus state.

15. The medium of claim 10, wherein the predetermined quantity of marking agent corresponds to a predetermined quantity of marking agent required to print an authorized number of pages.

16. The medium of claim 10, wherein the instructions cause the system to receive subscription data indicative of a marking agent subscription; and determine the marking agent subscription credit data according to rules included with the marking agent subscription.

17. The medium of claim 10, wherein the instructions cause the system to send and receive marking agent subscription setup messages via the second network.

18. The medium of claim 10, wherein the instructions cause the system to receive a print request from the printer via the second network.

19. The medium of claim 10, wherein the instructions cause the system to send the marking agent subscription credit data to the printer regardless of an amount of the marking agent physically present at the marking agent supply.

20. The medium of claim 10, wherein the printer is one of a plurality of printers, and wherein a plurality of marking agent subscription credit data is sent to the plurality of other printers via the first network in accordance with a plurality of marking agent subscriptions.

* * * * *

UNITED STATES PATENT AND TRADEMARK OFFICE
CERTIFICATE OF CORRECTION

PATENT NO. : 9,715,645 B2
APPLICATION NO. : 13/908912
DATED : July 25, 2017
INVENTOR(S) : Phillip A. Mccoog Page 1 of 1

It is certified that error appears in the above-identified patent and that said Letters Patent is hereby corrected as shown below:

In Column 17, Line 28, in Claim 13, delete "second is a cellular network" and insert -- second network --, therefor.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*